US012776293B2

(12) United States Patent
Zhao

(10) Patent No.: US 12,776,293 B2
(45) Date of Patent: Oct. 27, 2026

(54) SCREEN DISPLAY METHOD, DEVICE AND MEDIUM

(71) Applicant: GOERTEK INC., Weifang (CN)

(72) Inventor: Ying Zhao, Weifang (CN)

(73) Assignee: GOERTEK INC., Weifang (CN)

( * ) Notice: Subject to any disclaimer, the term of this patent is extended or adjusted under 35 U.S.C. 154(b) by 220 days.

(21) Appl. No.: 18/703,418

(22) PCT Filed: Nov. 16, 2021

(86) PCT No.: PCT/CN2021/130987
§ 371 (c)(1),
(2) Date: Apr. 22, 2024

(87) PCT Pub. No.: WO2023/070762
PCT Pub. Date: May 4, 2023

(65) Prior Publication Data

US 2025/0239237 A1 Jul. 24, 2025

(30) Foreign Application Priority Data

Oct. 29, 2021 (CN) ......................... 202111276772.4

(51) Int. Cl.
*G09G 5/393* (2006.01)
*G06F 3/147* (2006.01)
*G09G 5/391* (2006.01)

(52) U.S. Cl.
CPC ............. *G09G 5/393* (2013.01); *G06F 3/147* (2013.01); *G09G 5/391* (2013.01);
(Continued)

(58) Field of Classification Search
CPC ........ G06F 3/147; G09G 5/393; G09G 5/391; G09G 2360/12; G09G 2360/18; G09G 2360/123
See application file for complete search history.

(56) References Cited

U.S. PATENT DOCUMENTS

2005/0091585 A1* 4/2005 Parikh ..................... G06F 9/451 715/251
2011/0019089 A1* 1/2011 Bridges ................ H04N 7/0105 348/E5.009
2020/0292823 A1 9/2020 Niforatos et al.

FOREIGN PATENT DOCUMENTS

CN 102006501 A 4/2011
CN 103841461 A 6/2014
(Continued)

OTHER PUBLICATIONS

English translation of CN-106649621-A, Wang; Kun-Hui, May 10, 2017 (Year: 2017).*
(Continued)

*Primary Examiner* — Kee M Tung
*Assistant Examiner* — Alicia Ha
(74) *Attorney, Agent, or Firm* — Shih IP Law Group, PLLC

(57) ABSTRACT

The present application discloses a screen display method, device and medium, and relates to the field of display technology. The screen display method according to the present application comprises: receiving information to be displayed on the screen; determining whether the buffer memory required for displaying the information to be displayed is greater than the preset buffer memory; if not, controlling the screen to display the information to be displayed; if yes, which means that the buffer required for displaying the information to be displayed is too large at this time, then controlling the screen to select a display strategy for reducing the buffer memory usage to display the information to be displayed. By reducing the buffer size occupied by the information to be displayed, the information to be displayed can be stored in the buffer to display on the screen.

10 Claims, 4 Drawing Sheets

(52) U.S. Cl.
CPC ..... *G09G 2354/00* (2013.01); *G09G 2360/12* (2013.01); *G09G 2360/18* (2013.01)

(56) References Cited

FOREIGN PATENT DOCUMENTS

| | | | | | |
|---|---|---|---|---|---|
| CN | 104133649 | A | | 11/2014 | |
| CN | 105094540 | A | | 11/2015 | |
| CN | 106649621 | A | * | 5/2017 | ........... G06F 16/904 |
| CN | 106792446 | A | | 5/2017 | |
| CN | 106844780 | A | * | 6/2017 | ......... G06F 16/5846 |
| CN | 108965471 | A | | 12/2018 | |
| CN | 110415645 | A | | 11/2019 | |
| CN | 111381748 | A | * | 7/2020 | ........... G06F 3/0485 |

OTHER PUBLICATIONS

English translation of CN-106844780-A, Hu; Jiao, Jun. 13, 2017 (Year: 2017).*
English translation of CN-111381748-A, Liu; Yu-xuan, Jul. 7, 2020 (Year: 2020).*
STMicroelectronics, "Lowering Memory Usage with Partial Framebuffer", archived on Oct. 22, 2020, https://web.archive.org/web/20201022234236/https://support.touchgfx.com/docs/development/scenarios/lowering-memory-usage-with-partial-framebuffer (Year: 2020).*
International Search Report from International Application No. PCT/CN2021/130987 mailed Jul. 27, 2022.

* cited by examiner

SCREEN DISPLAY METHOD, DEVICE AND MEDIUM

This application claims the priority to the Chinese Patent Application No. 202111276772.4, entitled "screen display method, device and medium", submitted to the China Patent Office on Oct. 29, 2021, the entire content of which is incorporated herein by reference.

BACKGROUND

The present application relates to the field of display technology, and particularly, to a screen display method, device and medium.

At present, most smart bracelets are connected to mobile phones through Bluetooth Low Energy (BLE) technology. They can receive messages, phone calls, etc., notified by the mobile phone, and can also calculate the number of steps and synchronize them to the mobile phone. They generally have functions such as sports, GPS positioning, heart rate and blood oxygen monitoring, NFC and the like. The screen of the smart bracelet corresponds to one buffer, which is a pre-allocated buffer memory. The buffer memory stores the pixel content to be displayed.

Currently, when the bracelet displays information, it displays one screen of information at a time. The information to be displayed needs to be stored in the buffer in advance for display. Since the bracelet displays a large amount of data for one screen of information and the color screen uses RGB888 display, that is, one pixel is represented by 3 bytes, a large buffer needs to be allocated. If the system needs to allocate a large-enough memory space as a buffer memory buffer, this will, however, reduce the remaining space for system operation, which may result in insufficient system memory and insufficient memory for operation, thereby leading to a problem that shutdown occurs. If the buffer memory buffer allocated by the system is insufficient, such that the information to be displayed cannot be stored in the buffer at one time for display on the screen, this may cause the display information to be stuck.

It can be seen that how to save the memory occupied by the buffer is an urgent technical problem that needs to be solved by those skilled in the art.

SUMMARY

The purpose of the present application is to provide a screen display method that solves the problem of display information caused by insufficient buffer.

In order to solve the above technical problems, the present application provides a screen display method, comprising:

- receiving information to be displayed;
- determining whether a buffer memory required for displaying the information to be displayed is greater than a preset buffer memory;
- if so, controlling a screen to select a display strategy for reducing buffer memory usage to display the information to be displayed; and
- if not, controlling the screen to display the information to be displayed.

Preferably, in the screen display method as described above, the information to be displayed is the information to be displayed notified by a terminal device, and the information to be displayed only comprises picture information, and the determining whether the buffer memory required for displaying the information to be displayed is greater than the preset buffer memory comprises:

- determining whether a first buffer memory required for displaying the information to be displayed in a default format is greater than the preset buffer memory,
- if so, determining that the buffer memory required for displaying the information to be displayed is greater than the preset buffer memory;
- correspondingly, the controlling the screen to select a display strategy for reducing buffer memory usage to display the information to be displayed comprises: controlling the screen to display the information to be displayed as a text character;
- if not, determining that the buffer memory required for displaying the information to be displayed is not greater than the preset buffer memory;
- correspondingly, the controlling the screen to display the information to be displayed comprises: controlling the screen to display the information to be displayed in the default format.

Preferably, in the screen display method as described above, the information to be displayed is the information to be displayed notified by a terminal device, and the information to be displayed only comprises text information, and the determining whether the buffer memory required for displaying the information to be displayed is greater than the preset buffer memory comprises:

- determining whether a second buffer memory required for displaying the information to be displayed in a default format is greater than the preset buffer memory,
- if so, determining that the buffer memory required for displaying the information to be displayed is greater than the preset buffer memory;
- correspondingly, the controlling the screen to select a display strategy for reducing buffer memory usage to display the information to be displayed comprises: controlling the screen to display the information to be displayed in a low-resolution format, wherein the buffer memory required for displaying the information to be displayed in the default format is higher than the buffer memory required for displaying the information to be displayed in the low-resolution format;
- if not, determining that the buffer memory required for displaying the information to be displayed is not greater than the preset buffer memory;
- correspondingly, the controlling the screen to display the information to be displayed comprises: controlling the screen to display the information to be displayed in the default format.

Preferably, in the screen display method as described above, the information to be displayed is the information to be displayed notified by a terminal device, and the information to be displayed comprises picture information and text information, and the determining whether the buffer memory required for displaying the information to be displayed is greater than the preset buffer memory comprises:

- determining whether a third buffer memory required for displaying the picture information in the information to be displayed in a default format is greater than the preset buffer memory;
- if so, determining that the buffer memory required for displaying the information to be displayed is greater than the preset buffer memory;
- correspondingly, the controlling the screen to select a display strategy for reducing buffer memory usage to display the information to be displayed comprises: controlling the screen to display the picture information in the information to be displayed as a text character;

if not, determining that the buffer memory required for displaying the information to be displayed is not greater than the preset buffer memory;

correspondingly, the controlling the screen to display the information to be displayed comprises: controlling the screen to display the picture information in the information to be displayed in the default format.

Preferably, in the screen display method as described above, the determining whether the buffer memory required for displaying the information to be displayed is greater than the preset buffer memory further comprises:

determining whether a fourth buffer memory required for displaying the text information in the information to be displayed in the default format is greater than a remaining buffer memory, wherein the remaining buffer memory is a difference between the preset buffer memory and a buffer memory occupied by displaying the picture information in the information to be displayed;

if so, determining that the buffer memory required for displaying the information to be displayed is greater than the preset buffer memory;

correspondingly, the controlling the screen to select a display strategy for reducing buffer memory usage to display the information to be displayed comprises: controlling the screen to display the text information in the information to be displayed in a low-resolution format;

if not and if the third buffer memory is greater than the preset buffer memory, determining that the buffer memory required for displaying the information to be displayed is greater than the preset buffer memory;

correspondingly, the controlling the screen to select a display strategy for reducing buffer memory usage to display the information to be displayed comprises: controlling the screen to display the picture information in the information to be displayed as a text character, and displaying the text information in the information to be displayed in the default format;

if not and if the third buffer memory is not greater than the preset buffer memory, determining that the buffer memory required for displaying the information to be displayed is not greater than the preset buffer memory;

correspondingly, the controlling the screen to display the information to be displayed comprises: controlling the screen to display the picture information in the information to be displayed in the default format, and displaying the text information in the information to be displayed in the default format.

Preferably, in the screen display method as described above, the information to be displayed is the information to be displayed by a screen page UI, and the information to be displayed only comprises text information, and the determining whether the buffer memory required for displaying the information to be displayed is greater than the preset buffer memory comprises:

determining whether a fifth buffer memory required for displaying the text information in a default format is greater than the preset buffer memory;

if so, determining that the buffer memory required for displaying the information to be displayed is greater than the preset buffer memory;

correspondingly, the controlling the screen to select a display strategy for reducing buffer memory usage to display the information to be displayed comprises: controlling the screen to display the information to be displayed in a low-resolution format;

if not, determining that the buffer memory required for displaying the information to be displayed is not greater than the preset buffer memory;

correspondingly, the controlling the screen to display the information to be displayed comprises: controlling the screen to display the information to be displayed in the default format.

preferably, in the screen display method as described above, the information to be displayed is the information to be displayed by a screen page UI, and the information to be displayed comprises picture information and text information, and wherein the determining whether the buffer memory required for displaying the information to be displayed is greater than the preset buffer memory comprises:

determining whether a sixth buffer memory required for displaying the text information in a default format is greater than an available buffer memory, wherein the available buffer memory is a difference between the preset buffer memory and a buffer memory occupied by displaying the picture information in a preset format;

if so, determining that the buffer memory required for displaying the information to be displayed is greater than the preset buffer memory;

correspondingly, the controlling the screen to select a display strategy for reducing buffer memory usage to display the information to be displayed comprises: controlling the screen to display the picture information in the information to be displayed in the preset format and display the text information in the information to be displayed in a low-resolution format;

if not, determining that the buffer memory required for displaying the information to be displayed is not greater than the preset buffer memory;

correspondingly, the controlling the screen to display the information to be displayed comprises: controlling the screen to display the picture information in the information to be displayed in the preset format and display the text information in the information to be displayed in the default format.

Preferably, in the screen display method as described above, the displaying the text information in the low-resolution format comprises:

determining whether a seventh buffer memory required for displaying the text information in the low-resolution format is greater than the preset buffer memory;

if not, controlling the screen to display the text information in the low-resolution format;

if so, controlling the screen to paginate and display the text information in the low-resolution format.

Preferably, in the screen display method as described above, the preset buffer memory is a buffer memory required for completely displaying one page by the screen in a default format.

The present application further provides a screen display device, comprising:

a receiving module configured to receive information to be displayed;

a determination module configured to determine whether a buffer memory required for displaying the information to be displayed is greater than a preset buffer memory, and if so, triggering a selection display module, and if not, triggering a display module;

the selection display module configured to control a screen to select a display strategy for reducing buffer memory usage to display the information to be displayed; and the display module configured to control the screen to display the information to be displayed.

The present application further provides a screen display device, comprising:

a memory configured to store a computer program;

a processor configured to implement steps of the screen display method as described above when executing the computer program.

The present application further provides a computer-readable storage medium, wherein a computer program is stored in the computer-readable storage medium, and steps of the screen display method as described above is implemented when the computer program is executed by a processor.

The screen display method according to the present application: receives the information to be displayed on the screen; determines whether the buffer memory required for displaying the information to be displayed is greater than the preset buffer memory; if not, controls the screen to display the information to be displayed, and if yes, which means that the buffer required for displaying the information to be displayed is too large at this time, then controls the screen to select a display strategy for reducing the buffer memory usage to display the information to be displayed. By reducing the size of the buffer occupied by the information to be displayed, the information to be displayed can be stored in the buffer to display on the screen, thereby avoiding the problematic display results caused by still displaying the information to be displayed when the buffer is insufficient.

In addition, the present application also provides a screen display device and a computer-readable storage medium, comprising the above screen display method, with the same effect as above.

BRIEF DESCRIPTION OF DRAWINGS

In order to explain the embodiments of the present application more clearly, the drawings required to be used in the embodiments will be briefly introduced below. Obviously, the drawings in the following description are only some embodiments of the present application. For those of ordinary skill in the art, other drawings can also be obtained based on these drawings without exerting creative work.

DETAILED DESCRIPTIONS

The technical solutions in the embodiments of the present application will be clearly and completely described below with reference to the accompanying drawings in the embodiments of the present application. Obviously, the described embodiments are only some of the embodiments of the present application, rather than all of the embodiments. Based on the embodiments in the present application, all other embodiments obtained by those of ordinary skill in the art without creative efforts fall within the protection scope of the present application.

The core of the present application is to provide a screen display method that solves the problem of insufficient memory when the buffer memory required for displaying information is greater than the buffer memory of the device itself.

In order to enable those skilled in the art to better understand the solution of the present application, the present application will be further described in detail below in conjunction with the accompanying drawings and specific embodiments.

Figure 1:
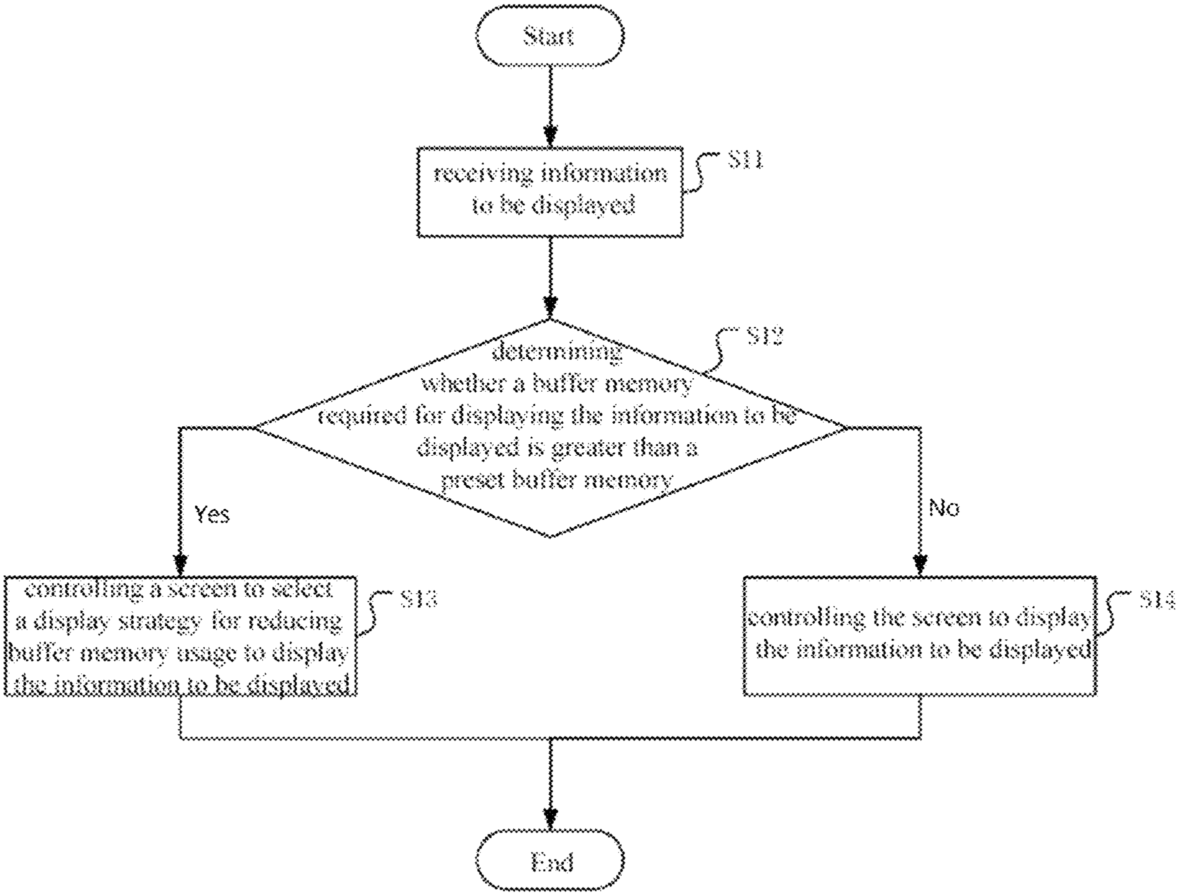
FIG. 1 is a flow chart of a screen display method according to an embodiment of the present application.

FIG. 1 is a flow chart of a screen display method according to an embodiment of the present application. An embodiment of the present application provides a screen display method, as shown in FIG. 1, comprising:

S11: receiving information to be displayed;

S12: determining whether a buffer memory required for displaying the information to be displayed is greater than a preset buffer memory; if so, proceeding to step S13; if not, proceeding to step S14;

S13: controlling the screen to select a display strategy for reducing the buffer memory usage to display the information to be displayed;

S14: controlling the screen to display information to be displayed.

The screen display method according to this embodiment is suitable for various electronic devices having screens. The electronic devices mentioned in this embodiment comprise but are not limited to smart watches, smart bracelets and other electronic devices.

Step S11 receives information to be displayed, which refers to information to be displayed on the screen of the electronic device, comprising but not limited to, information to be displayed on the next page of the screen when the UI of the electronic device is switched, the information to be displayed that needs to be displayed on the screen when the electronic device changes from a shutdown state to a startup state, and the received information to be displayed that is notified by the terminal device when the electronic device is connected to the terminal device. In addition, this embodiment does not limit the specific type of information to be displayed. For example, the information to be displayed is only picture information, or the information to be displayed is only text information, or the information to be displayed is a combination of picture information and text information.

After receiving the information to be displayed in step S11, proceeding to step S12 to determine whether the buffer memory required for displaying the information to be displayed is greater than the preset buffer memory.

Before the information to be displayed is displayed on the screen, the information to be displayed needs to be stored in one buffer zone "buffer" in the system corresponding to the screen. The buffer is a pre-allocated buffer memory. The buffer is used to store the pixel content of the information to be displayed and display the information to be displayed that is stored in the buffer on the screen through the buffer interface.

In general circumstances, the information to be displayed is usually displayed in a default format or a preset format.

The default format as described in this embodiment is a default RGB color mode adopted when displaying the information to be displayed on the screen. The RGB color mode is a color standard in the industry, and a variety of colors are obtained by changing the three-color channels of red (R), green (G), and blue (B) and superimposing them on each other. For example, if the RGB888 pixel format is used to display the information to be displayed and the information to be displayed is stored in the buffer, one pixel occupies 3 bytes; if the RGB 565-pixels format is used to display the information to be displayed and the information to be displayed is stored in the buffer, one pixel occupies 2 bytes. This embodiment does not limit the specific format of the default format, and it can be set according to the actual situation. In general circumstances, in order to prevent the display information from being distorted, RGB888 is often used to display all information to be displayed. This requires that the buffer allocated by the system must be large enough, otherwise it may cause the display information to be stuck.

The preset format as described in this embodiment refers generally to that the pre-stored picture information is stored in the electronic device in a preset format. When the information to be displayed comprises the pre-stored picture information, the pre-stored picture information is directly retrieved from the database and displayed in the pre-stored format.

The preset buffer memory as described in this embodiment refers to one preset buffer memory value. The preset memory value is not greater than the actual memory size of the buffer allocated by the system, and is not greater than the memory value of the buffer required for completely displaying one page by the screen of the electronic device in the default format. That is, the actual memory size of the buffer allocated by the system needs to be no less than the memory value of the buffer required for completely displaying one page by the screen of the electronic device in the default format, so as to ensure that the buffer allocated by the system can completely store the information to be displayed for displaying one page of the screen in the default format. This embodiment does not specifically limit the buffer memory value. For example, the buffer memory value may be the memory value of the buffer required for completely displaying one page by the screen of the electronic device in the default format, or may be smaller than the memory value of the buffer required for completely display one page by the screen of the electronic device in the default format.

Step S12, specifically, after receiving the information to be displayed, calculating the buffer memory required for displaying the information to be displayed, and determining whether the required buffer memory is greater than the preset buffer memory.

If the default format is used to display the information to be displayed, it is calculated that the buffer memory required for displaying the information to be displayed in the default format is not greater than the preset buffer memory, this indicates that the information to be displayed can be stored in the buffer for display on the screen; if the buffer memory required for displaying the information to be displayed in the default format is greater than the preset buffer memory, this indicates that the buffer memory required for displaying the information to be displayed in the default format exceeds the preset buffer memory, which may cause page stuck or shutdown.

If the information to be displayed comprises a pre-stored picture, then when calculating the buffer required for displaying the information to be displayed, the pre-stored picture will not be used to calculate the required buffer memory in the preset format.

If the buffer memory required for displaying the information to be displayed in the default format is not greater than the preset buffer memory, proceeding to Step S14 to control the screen to display the information to be displayed. Specifically, the information to be displayed is stored in the buffer in the default format or the preset format, and the information to be displayed stored in the buffer is displayed on the screen in the default format or the preset format through the buffer interface.

If the buffer memory required for displaying the information to be displayed in the default format or the preset format is greater than the preset buffer memory, proceeding to Step S13 to control the screen to select a display strategy for reducing the buffer memory usage to display the information to be displayed. The display strategy for reducing the buffer memory usage refers to changing the display method of the information to be displayed to reduce the size of the required buffer, so that the information to be displayed can be stored in the buffer at one time. This embodiment does not specifically limit the specific content of the display strategy for reducing the buffer memory usage. It can be designed according to the actual situation. For example, reducing the resolution of the information to be displayed to reduce the size of the buffer required for storage, or by reducing display content to reduce the size of the buffer required for storage, or by converting the information to be displayed into a specific identifier to reduce the size of the buffer required for storage.

The screen display method provided in this embodiment, after receiving the information to be displayed, calculates the buffer memory size required when the information to be displayed is displayed in the default format or the preset format, and determines whether the buffer memory required for displaying the information to be displayed in the default format or the preset format is greater than the preset buffer memory; if not, controls the screen to display the information to be displayed in the default format or preset format; and if yes, it indicates that the buffer required for displaying the information to be displayed is too large at this time, then controls the screen to select the display strategy for reducing the buffer memory usage to display the information to be displayed so that the information to be displayed can be stored in the buffer. By reducing the size of the buffer occupied by the information to be displayed, so that it can be stored in the buffer for easy display on the screen, thus avoiding the problematic display results, caused by still displaying the information to be displayed when the buffer is insufficient. Through the method according to this embodiment, when the total memory of the system is limited, the system does not have to allocate a very large buffer to store information to be displayed, thereby saving the memory occupied by the buffer, making more memory available for system operation, and also more memory available for developing new functions. It is also possible to use a chip with a smaller total memory to reduce costs by the method according to this embodiment.

According to the above embodiments, the electronic device can be connected to the terminal device, and receive the information to be displayed notified by the terminal device for display on the screen of the electronic device. This embodiment provides an optimal solution to receive information to be displayed notified by the terminal device.

As mentioned in this embodiment, the electronic device is connected to the terminal device and can receive information to be displayed notified by the terminal device. The terminal device mentioned in this embodiment can be an electronic product such as a mobile phone or a tablet computer. In addition, this embodiment does not limit the connection method between the terminal device and the electronic device. For example, the terminal device and the electronic device can be connected through Bluetooth or wired connection through a data cable. Specifically, for example, the smart bracelet can be connected to the mobile phone device through Bluetooth. When there is a message to be notified by the mobile phone, the smart bracelet can receive the message notified by the mobile phone via Bluetooth and display it on the screen of the bracelet to enhance portability.

1) According to the above embodiment, if the electronic device is connected to the terminal device, the electronic device receives the information to be displayed notified by the terminal device to display on the screen of the electronic device. In the above-described screen display method, if the information to be displayed is the information to be displayed notified by a terminal device, and the information to be displayed only comprises picture information, then the determining whether the buffer memory required for displaying the information to be displayed is greater than the preset buffer memory comprises:

determining whether a first buffer memory required for displaying the information to be displayed in a default format is greater than the preset buffer memory, if so, determining that the buffer memory required for displaying the information to be displayed is greater than the preset buffer memory;

correspondingly, the controlling the screen to select a display strategy for reducing buffer memory usage to display the information to be displayed comprises: controlling the screen to display the information to be displayed as a text character;

if not, determining that the buffer memory required for displaying the information to be displayed is not greater than the preset buffer memory;

correspondingly, the controlling the screen to display the information to be displayed comprises: controlling the screen to display the information to be displayed in the default format.

This embodiment proposes an optimal solution for the case where the information to be displayed is the information to be displayed notified by the terminal device, and the information to be displayed only comprises picture information. When the information to be displayed in the default format exceeds the preset buffer-, selecting the display strategy for reducing the buffer size occupied by the information to be displayed,—so that it can be stored in the buffer for easy display on the screen, and avoid the problematic display results caused by still displaying the information to be displayed when the buffer is insufficient.

2) If the information to be displayed is the information to be displayed notified by a terminal device, and the information to be displayed only comprises text information, then the determining whether the buffer memory required for displaying the information to be displayed is greater than the preset buffer memory comprises:

determining whether a second buffer memory required for displaying the information to be displayed in the default format is greater than the preset buffer memory, if so, determining that the buffer memory required for displaying the information to be displayed is greater than the preset buffer memory;

correspondingly, the controlling the screen to select a display strategy for reducing buffer memory usage to display the information to be displayed comprises: controlling the screen to display the information to be displayed in a low-resolution format; wherein the buffer memory required for displaying the information to be displayed in the default format is greater than the buffer memory required for displaying in the low-resolution format;

if not, determining that the buffer memory required for displaying the information to be displayed is not greater than the preset buffer memory;

correspondingly, the controlling the screen to display the information to be displayed comprises: controlling the screen to display the information to be displayed in the default format.

This embodiment proposes an optimal solution for the case where the information to be displayed is the information to be displayed notified by the terminal device, and the information to be displayed only comprises text information. When the information to be displayed in the default format exceeds the preset buffer, selecting the display strategy for reducing the buffer size occupied by the information to be displayed so that it can be stored in the buffer for easy display on the screen, and avoid the problematic display results caused by still displaying the information to be displayed when the buffer is insufficient.

3) If the information to be displayed is the information to be displayed notified by a terminal device, and the information to be displayed comprises picture information and text information, then the determining whether the buffer memory required for displaying the information to be displayed is greater than the preset buffer memory comprises:

determining whether a third buffer memory required for displaying the picture information in the information to be displayed in the default format is greater than the preset buffer memory;

if so, determining that the buffer memory required for displaying the information to be displayed is greater than the preset buffer memory;

correspondingly, the controlling the screen to select a display strategy for reducing buffer memory usage to display the information to be displayed comprises: controlling the screen to display the picture information in the information to be displayed as a text character;

if not, determining that the buffer memory required for displaying the information to be displayed is not greater than the preset buffer memory;

correspondingly, the controlling the screen to display the information to be displayed comprises: controlling the screen to display the picture information in the information to be displayed in the default format.

This embodiment proposes an optimal solution for the case where the information to be displayed is the information to be displayed notified by the terminal device, and the information to be displayed comprises picture information and text information. When the information to be displayed in the default format exceeds the preset buffer, selecting the display strategy for reducing the buffer size occupied by the information to be displayed so that it can be stored in the buffer for easy display on the screen, thereby avoiding the problematic display results caused by still displaying the information to be displayed when the buffer is insufficient.

4) If the information to be displayed is the information to be displayed notified by a terminal device, and the information to be displayed comprises picture information and text information, then the determining whether the buffer memory required for displaying the information to be displayed is greater than the preset buffer memory further comprises:

determining whether a fourth buffer memory required for displaying the text information in the information to be displayed in the default format is greater than a remaining buffer memory; wherein the remaining buffer memory is a difference between the preset buffer memory and the buffer memory occupied by displaying the picture information in the information to be displayed;

if so, determining that the buffer memory required for displaying the information to be displayed is greater than the preset buffer memory;

correspondingly, the controlling the screen to select a display strategy for reducing buffer memory usage to display the information to be displayed comprises: controlling the screen to display the text information in the information to be displayed in a low-resolution format;

if not and if the third buffer memory is greater than the preset buffer memory, determining that the buffer memory required for displaying the information to be displayed is greater than the preset buffer memory;

correspondingly, the controlling the screen to select a display strategy for reducing buffer memory usage to display the information to be displayed comprises: controlling the screen to display the picture information in the information to be displayed as a text character, and displaying the text information in the information to be displayed in the default format;

if not and if the third buffer memory is not greater than the preset buffer memory, determining that the buffer memory required for displaying the information to be displayed is not greater than the preset buffer memory;

correspondingly, the controlling the screen to display the information to be displayed comprises: controlling the screen to display the picture information in the information to be displayed in the default format, and displaying the text information in the information to be displayed in the default format.

This embodiment proposes an optimal solution for the case where the information to be displayed is the information to be displayed notified by the terminal device and the information to be displayed comprises picture information and text information. When the text information of the information to be displayed is displayed in the default format and exceeds the preset buffer, selecting the display strategy for reducing the buffer size occupied by the information to be displayed so that it can be stored in the buffer for easy display on the screen, thereby avoiding the problematic display results caused by still displaying the information to be displayed when the buffer is insufficient.

The electronic device receives the information to be displayed notified by the terminal device, which generally does not comprise the picture information pre-stored by the electronic device. Therefore, it is determined whether the buffer memory required to receive and display the information to be displayed notified by the terminal device in the default format is greater than the preset buffer memory.

The embodiment of the present application does not limit the type of the picture information mentioned, such as whether it is a grayscale picture or a color picture, nor does it limit the resolution of the picture information; in addition, this embodiment does not limit the type of the text information mentioned, such as whether it is Chinese characters, numbers or letters, nor does it limit the amount of text information and the display size. This embodiment does not limit the source of the information to be displayed. This embodiment does not impose specific restrictions on whether the source is WeChat message notifications notified by the mobile terminal, or SMS messages, incoming call notifications, etc.

Specifically, if the information to be displayed only comprises picture information, it is determined whether the first buffer memory required for displaying the information to be displayed in the default format is greater than the preset buffer memory. If the first buffer memory is not greater than the preset buffer memory, it is determined that the information to be displayed in the default format can be stored in the buffer allocated by the system. If the first buffer memory is greater than the default buffer memory, it is determined that, if the information to be displayed is stored in the default format, information may be lost. If the picture information is displayed by using a method of reducing the color format, it will cause image distortion. Therefore, this embodiment provides an optimal solution. When the first buffer memory is greater than the preset buffer memory, the screen is controlled to display the information to be displayed as a text character. For example, when the first buffer memory is greater than the preset buffer memory, the picture information is not displayed, and a text character of "picture received" is displayed to remind the user that the picture information is received at the mobile terminal.

Specifically, if the information to be displayed only comprises text information, it is determined whether the second buffer memory required for displaying the information to be displayed in the default format is greater than the preset buffer memory. If the second buffer memory is not greater than the preset buffer memory, it is determined that the information to be displayed in the default format can be stored in the buffer allocated by the system. If the second buffer memory is greater than the preset buffer memory, it is determined that if the information to be displayed is stored in the buffer in the default format, information may be lost. Normally, the text is displayed in a single color, such as black, therefore reducing the color format of the displayed text information may not affect the user experience. Therefore, this embodiment provides an optimal solution. When the second buffer memory is greater than the preset buffer memory, the screen is controlled to display the information to be displayed in a low-resolution format, wherein the buffer memory required for displaying the information to be displayed in the default format is greater than the buffer memory required for displaying in the low-resolution format. For example, if the default format is RGB888, RGB565 can be adopted for the low-resolution format. Using a low-resolution format for text information can reduce the memory required for storing the information to be displayed in the buffer without affecting the user experience.

Specifically, if the information to be displayed comprises picture information and text information, it is determined whether the third buffer memory required for displaying the picture information in the information to be displayed in the default format is greater than the preset buffer memory, and it is determined whether the fourth buffer memory required for displaying the text information in the information to be displayed in the default format is greater than the remaining buffer memory, wherein the remaining buffer memory is the difference between the preset buffer memory and the buffer memory occupied by displaying the picture information in the information to be displayed.

If the third buffer memory is not greater than the default buffer memory and the fourth buffer memory is not greater than the remaining memory, that is, the sum of buffers required for displaying the image information and text information in the information to be displayed in the default format does not exceed the default buffer memory, therefore display the information to be displayed in the default format, that is, storing the information to be displayed in the buffer in the default format and displaying the information to be displayed on the screen of the electronic device through the buffer interface.

Preferably, at first, it is determined whether the third buffer memory is greater than the preset buffer memory, and then it is determined whether the fourth buffer memory is greater than the remaining buffer memory.

If the third buffer memory is not greater than the preset buffer memory, that is, the buffer required to display the picture information of the information to be displayed in the default format does not exceed the preset buffer memory, then selecting to display the picture information in the information to be displayed in the default format. In this case, the size of the remaining buffer memory is the difference between the preset buffer memory and the buffer memory required for displaying the picture information in the information to be displayed in the default format; if the third buffer memory is greater than the preset buffer memory, that is, the buffer required to display the picture information in the information to be displayed in the default format exceeds the preset buffer memory, then selecting to display the picture information in the information to be displayed as a text character to reduce the buffer memory required for the picture information. In this case, the size of the remaining buffer memory is the difference between the preset buffer memory and the buffer memory required for displaying the text character.

If the fourth buffer memory is not greater than the remaining buffer memory, that is, the buffer required for displaying the text information of the information to be displayed in the default format does not exceed the remaining buffer memory, then selecting to display the text information in the information to be displayed in the default format; if the fourth buffer is greater than the remaining buffer memory, that is, the buffer required for displaying the text information in the information to be displayed in the default format exceeds the remaining buffer memory, then selecting the text information in the information to be displayed in a low-resolution format to reduce the buffer memory required for displaying the text information in the information to be displayed.

Figure 2:
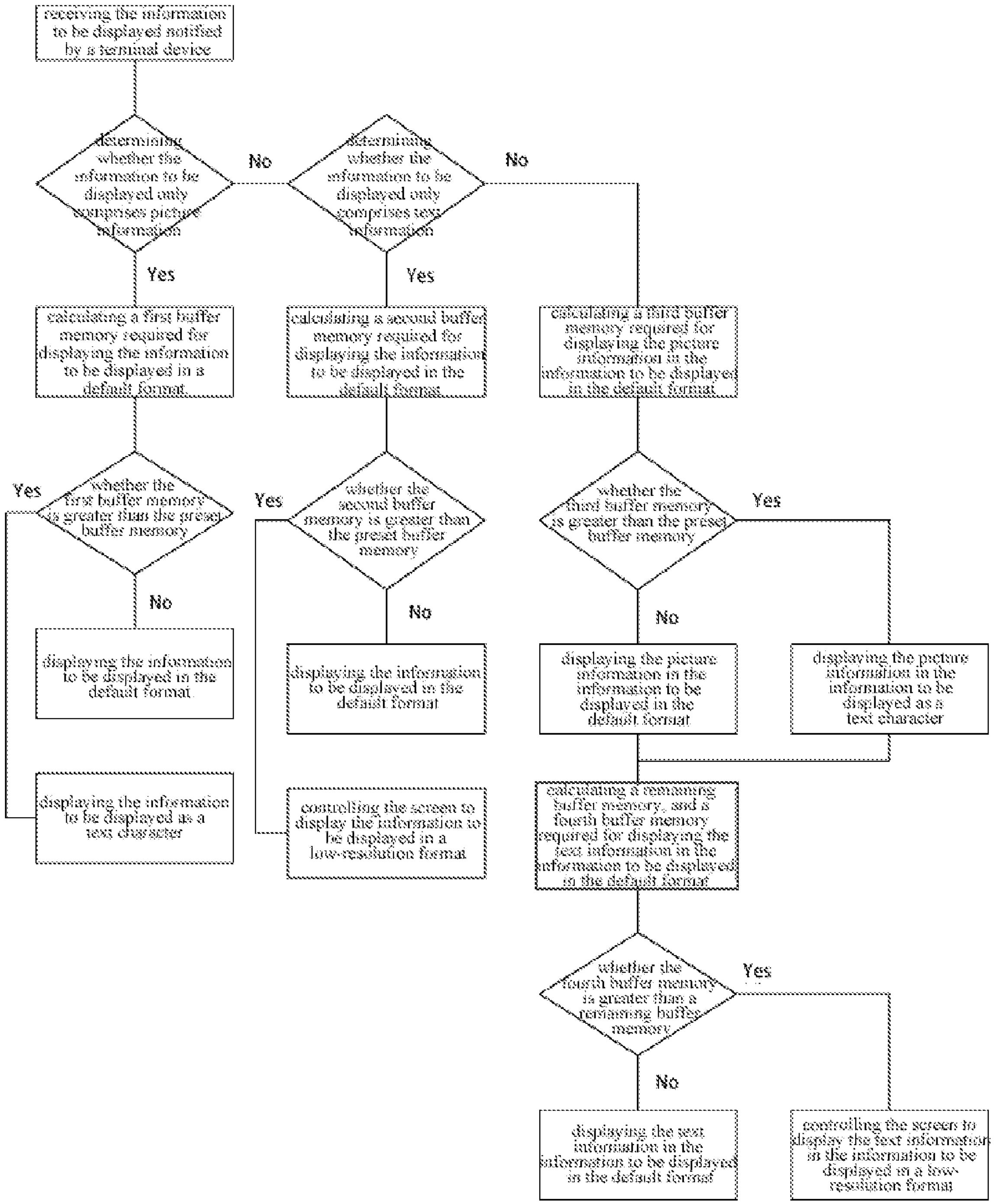
FIG. 2 is a flow chart of a screen display method for receiving information to be displayed notified by a terminal device according to an embodiment of the present application.

In order to enable those skilled in the art to better understand the technical solution of the present application, the above-mentioned embodiment of the present application will be further described in detail below in conjunction with FIG. 2. FIG. 2 is a flow chart of a screen display method for receiving information to be displayed notified by a terminal device according to an embodiment of the present application. As shown in FIG. 2, the method comprises:

- receiving the information to be displayed notified by a terminal device; determining whether the information to be displayed only comprises picture information; if so, calculating a first buffer memory required for displaying the information to be displayed in a default format and determining whether the first buffer memory is greater than the preset buffer memory; if so, displaying the information to be displayed as a text character; if not, displaying the information to be displayed in the default format;
- if the information to be displayed does not comprise only the picture information, then determining whether the information to be displayed only comprises text information; if the information to be displayed only comprises text information, calculating a second buffer memory required for displaying the information to be displayed in the default format and determining whether the second buffer memory is greater than the preset buffer memory; if so, controlling the screen to display the information to be displayed in a low-resolution format; if not, displaying the information to be displayed in the default format;
- if the information to be displayed does not comprise only the text information, that is, the information to be displayed comprises the picture information and the text information, then calculating a third buffer memory required for displaying the picture information in the information to be displayed in the default format and determining whether the third buffer memory is greater than the preset buffer memory; if so, displaying the picture information in the information to be displayed as a text displaying the picture information in the information to be displayed in the default format; calculating a remaining buffer memory and a fourth buffer memory required for displaying the text information in the information to be displayed in the default format and determining whether the fourth buffer memory is greater than a remaining buffer memory; if so, controlling the screen to display the information to be displayed in a low-resolution format; if not, displaying the information to be displayed in the default format.

According to the above embodiments, when the electronic device displays information with its own function, this embodiment provides an optimal solution to receive the information to be displayed on the screen page UI.

The information to be displayed on the screen page UI mentioned in this embodiment comprises the information to be displayed on the next page of the screen when the UI of the electronic device is switched, and the information to be displayed on the screen when the electronic device is switched from the shutdown state to the startup state. This embodiment does not limit the specific type of the information to be displayed, the information to be displayed may be sports data display, GPS positioning information, heart rate and blood oxygen monitoring information, etc.

When the user turns on the electronic device or performs a page UI switching operation on the electronic device, the information content to be displayed on the screen is the information to be displayed.

1) According to the above embodiment, receiving the information to be displayed on the screen page UI.

The information to be displayed is the information to be displayed by a screen page UI, and if the information to be displayed only comprises text information, the determining whether the buffer memory required for displaying the information to be displayed is greater than the preset buffer memory comprises:

- determining whether a fifth buffer memory required for displaying the text information in the default format is greater than the preset buffer memory,
- if so, determining that the buffer memory required for displaying the information to be displayed is greater than the preset buffer memory;
- correspondingly, the controlling the screen to select a display strategy for reducing buffer memory usage to display the information to be displayed comprises: controlling the screen to display the information to be displayed in a low-resolution format;
- if not, determining that the buffer memory required for displaying the information to be displayed is not greater than the preset buffer memory;

correspondingly, the controlling the screen to display the information to be displayed comprises: controlling the screen to display the information to be displayed in the default format.

This embodiment proposes an optimal solution for the case where the information to be displayed is the information to be displayed on the screen page UI, and the information to be displayed only comprises text information. When the picture information of the information to be displayed is displayed in the default format and exceeds the preset buffer, by selecting a display strategy that reduces the size of the buffer occupied by the information to be displayed, the information to be displayed can be stored in the buffer for easy display on the screen, thereby avoiding the problematic display results caused by still displaying the information to be displayed when the buffer is insufficient.

2) If the information to be displayed is the information to be displayed by a screen page UI, and the information to be displayed comprises picture information and text information, the determining whether the buffer memory required for displaying the information to be displayed is greater than the preset buffer memory comprises:

determining whether a sixth buffer memory required for displaying the text information in the default format is greater than an available buffer memory; wherein the available buffer memory is a difference between the preset buffer memory and the buffer memory occupied by displaying the picture information in the preset format;

if so, it is determined that the buffer memory required for displaying the information to be displayed is greater than the preset buffer memory;

correspondingly, the controlling the screen to select a display strategy for reducing buffer memory usage to display the information to be displayed comprises: controlling the screen to display the picture information in the information to be displayed in the preset format and display the text information in the information to be displayed in the low-resolution format;

if not, determining that the buffer memory required for displaying the information to be displayed is not greater than the preset buffer memory;

correspondingly, the controlling the screen to display the information to be displayed comprises: controlling the screen to display the picture information in the information to be displayed in the preset format and display the text information in the information to be displayed in the default format.

This embodiment proposes an optimal solution for the case where the information to be displayed is the information to be displayed on the screen page UI, and the information to be displayed comprises picture information and text information. When the picture information of the information to be displayed is displayed in the default format and exceeds the preset buffer, by selecting a display strategy that reduces the size of the buffer occupied by the information to be displayed, the information to be displayed can be stored in the buffer for easy display on the screen, thereby avoiding the problematic display results caused by still displaying the information to be displayed when the buffer is insufficient.

In addition, if the information to be displayed is the information to be displayed on the screen page UI, and the information to be displayed only comprises picture information, and for the functions of the electronic device itself, when it performs UI display, the information to be displayed is generally preset content, the displayed pictures are usually preset pre-stored picture information stored in the electronic device. Therefore, when pre-storing these preset pictures, a preset format lower than the upper limit of the screen display may be selected, that is, the image information in the information to be displayed on the screen UI can be displayed on the screen and will not exceed the memory size of the buffer. Therefore, this embodiment does not limit whether to perform the step of determining whether the buffer memory required for displaying the information to be displayed is greater than the preset buffer memory, if the information to be displayed is the information to be displayed on the screen page UI, and the information to be displayed only comprises picture information. If performing the step of determining whether the buffer memory required for displaying the information to be displayed is greater than the preset buffer memory, the determination result is inevitably that, the buffer memory required for displaying the information to be displayed is not greater than the preset buffer memory, and it is then proceeded to the step of controlling the screen to display the information to be displayed and controlling the screen to display the information to be displayed in a preset format.

Since the text displayed on the page UI may change the text information to be displayed due to the variability of the functions, it may result in insufficient buffer required for displaying the text information in the default format. Therefore, the display strategy of the information to be displayed on the screen UI is different from the display strategy of the received information to be displayed notified by the terminal device.

Specifically, if the information to be displayed only comprises text information, it is determined whether the fifth buffer memory required for displaying the text information in the default format is greater than the preset buffer memory. If the fifth buffer memory is not greater than the default buffer memory, it is determined that the information to be displayed in the default format can be stored in the buffer allocated by the system for display on the screen of the electronic device; if the fifth buffer memory is greater than the default buffer memory, then it is determined that, if the information to be displayed is stored in the buffer in the default format, information may be lost. Generally, text is displayed in a single color, such as black, thereby reducing the color format of text information display may not affect the user experience. Therefore, this embodiment provides an optimal solution, that is, when the fifth buffer memory is greater than the preset buffer memory, controlling the screen to display the information to be displayed in a low-resolution format, wherein the buffer memory required for displaying the information to be displayed in the default format is higher than the buffer memory required for displaying in the low-resolution format. For example, if the default format is RGB888, RGB565 may be adopted for the low-resolution format. Using a low-resolution format for text information can reduce the memory required for displaying and storing the information to be displayed in the buffer without affecting the user experience.

Specifically, if the information to be displayed comprises picture information and text information, it is determined whether the sixth buffer memory required for displaying the text information in the default format is greater than the available buffer memory, wherein the available buffer memory is the difference between the preset buffer memory and the buffer memory occupied by the displayed picture information. The buffer memory occupied by the displayed picture information may refer to the buffer size required for displaying in the format of pre-storing the picture information.

If the sixth buffer memory is not greater than the available buffer memory, it is determined that, after storing the picture information in the information to be displayed in the buffer, the available buffer memory is available for the text information in the information to be displayed to be stored in the default format. Therefore, the picture information is controlled to be stored in the buffer in the pre-stored format, the text information is controlled to be stored in the buffer in the default format, the picture information and the text information are displayed on the screen through the buffer interface;

If the sixth buffer memory is greater than the available buffer memory, it is determined that, after storing the picture information in the information to be displayed in the buffer, the available buffer memory is not available for the text information in the information to be displayed to be stored in the default format. Therefore, this embodiment provides an optimal solution to control the picture information in the information to be displayed to be stored in the buffer in a pre-stored format, and control the text information in the information to be displayed to be stored in the buffer in a low-resolution format, and display the picture information and the text information on the screen through the buffer interface.

Figure 3:
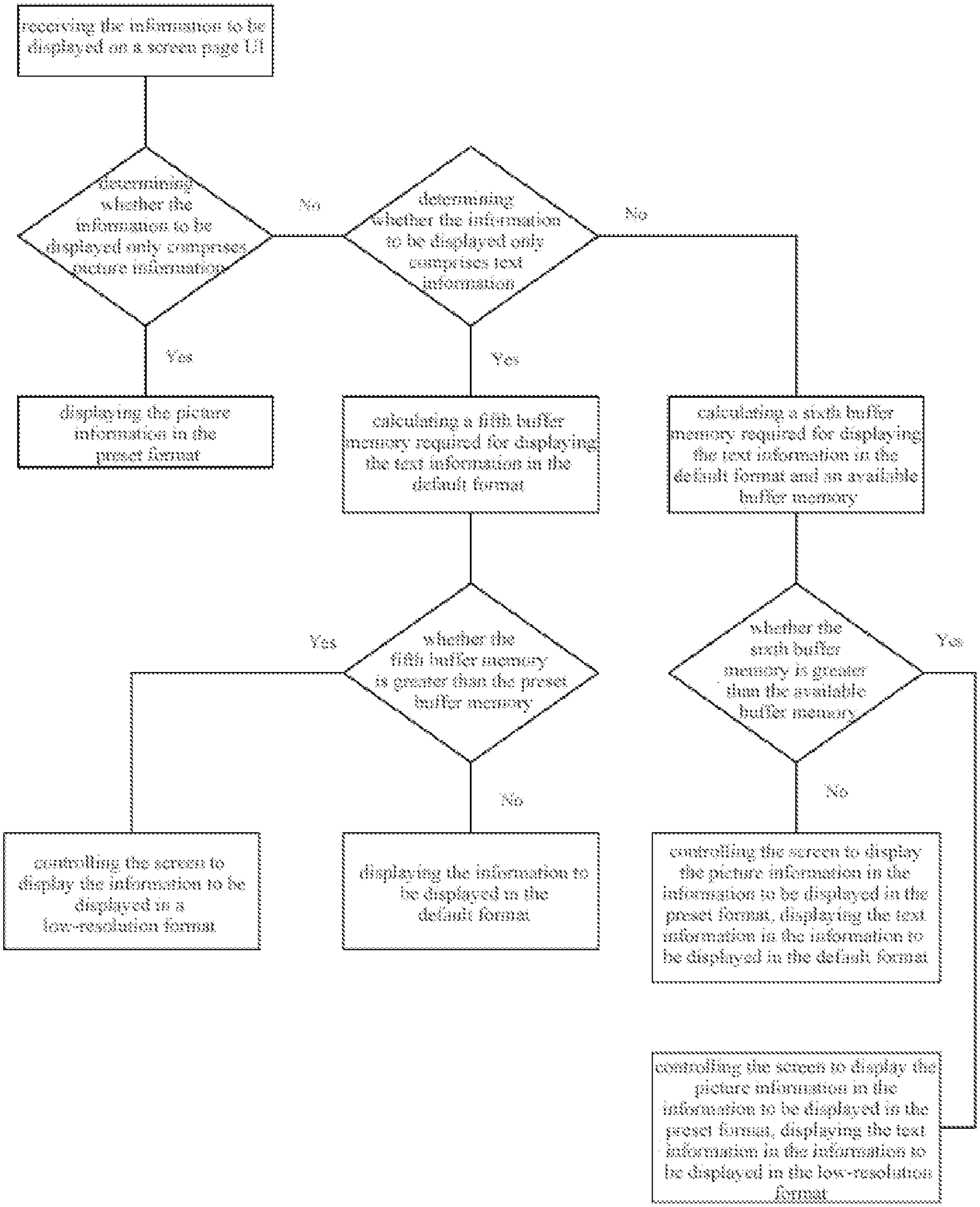
FIG. 3 is a flow chart of a screen display method for receiving information to be displayed on a screen UI according to an embodiment of the present application.

In order to enable those skilled in the art to better understand the technical solution of the present application, the above-mentioned embodiment of the present application will be further described in detail below in conjunction with FIG. 3. FIG. 3 is a flow chart of a screen display method for receiving information to be displayed on a screen UI according to an embodiment of the present application. As shown in FIG. 3, the method comprises:

- receiving the information to be displayed by a screen page UI; determining whether the information to be displayed only comprises picture information; if so, displaying the picture information in the preset format;
- if the information to be displayed does not comprises only the picture information, determining whether the information to be displayed only comprises text information; if so, calculating a fifth buffer memory required for displaying the text information in the default format and determining whether the fifth buffer memory is greater than the preset buffer memory; if so, controlling the screen to display the information to be displayed in a low-resolution format; if not, displaying the information to be displayed in the default format;
- if the information to be displayed does not comprises only the text information, that is, the information to be displayed comprises the text information and the text information, calculating a sixth buffer memory required for displaying the text information in the default format and an available buffer memory and determining whether the sixth buffer memory is greater than the available buffer memory; if not, controlling the screen to display the picture information in the information to be displayed in the preset format and display the text information in the information to be displayed in the default format; if so, controlling the screen to display the picture information in the information to be displayed in the preset format and display the text information in the information to be displayed in the low-resolution format.

According to the above embodiment, if the information to be displayed comprises text information, and the buffer memory required when the text information is displayed at a low resolution is still insufficient, this embodiment provides an optimal solution for the screen display method, the displaying the text information in the low-resolution format comprises:

- determining whether a seventh buffer memory required for displaying the text information in the low-resolution format is greater than the currently available buffer memory;
- If not, controlling the screen to display the text information in the low-resolution format;
- If so, controlling the screen to paginate and display the text information in the low-resolution format.

The currently available buffer memory mentioned in this embodiment is different from the available memory mentioned in the above embodiment. Specifically, in the case that the information to be displayed notified by the terminal device is received and the information to be displayed only comprises text information, the currently available buffer memory refers to the preset buffer memory; in the case that the information to be displayed notified by the terminal device is received and the information to be displayed comprises picture information and text information, the currently available buffer memory refers to the remaining buffer memory, that is, the difference between the preset buffer memory and the buffer memory occupied by the displayed picture information in the information to be displayed; in the case that the information to be displayed on the screen page UI is received and the information to be displayed only comprises text information, the currently available buffer memory refers to the preset buffer memory; and in the case that the information to be displayed on the screen page UI is received and the information to be displayed comprises picture information and text information, the currently available buffer memory refers to the available buffer memory, that is, the difference between the preset buffer memory and the buffer memory occupied by the displayed picture information.

If the seventh buffer memory required for displaying the text information in the low-resolution format is not greater than the currently available buffer memory, it is determined that the currently available buffer memory can store the text information displayed in the low-resolution format, therefore the screen is controlled to display the text information in the low-resolution format; if the seventh buffer memory required for displaying the text information in the low-resolution format is greater than the currently available buffer memory, it is determined that the currently available buffer memory cannot store the text information displayed in the low-resolution format. This embodiment provides an optimal solution, that is, controlling the screen to paginate and display the text information in the low-resolution format.

The paginating and displaying the text information specifically refers to sequentially dividing the text information in the information to be displayed, and storing the text information enough to display on one page in the buffer. When the stored text information is displayed on the screen, the text information on the next page is stored, until all the text information is completely stored and displayed.

The method provided in this embodiment can paginate and display the text information when there is too much text information in the information to be displayed and cannot be displayed at one time, in this way, insufficient buffer and information loss can be prevented.

According to the above embodiment, since the preset buffer memory is not greater than the actual memory size of the buffer allocated by the system, and is not greater than the memory value of the buffer required for completely displaying one page by the screen of the electronic device in the default format, this embodiment provides an optimal solution, that is, the preset buffer memory is the buffer memory required for completely displaying one page by the screen in the default format.

In actual situations, the maximum preset buffer memory can be the buffer memory required for completely displaying one page by the screen in the default format. Specifically, if the preset buffer memory is smaller than the buffer memory required for completely displaying one page by the screen in the default format, it may cause determination result that the buffer memory required for displaying the information to be displayed is greater than the preset buffer memory since the preset buffer memory is small even though the actual buffer memory can display the information to be displayed. Therefore, the solution according to this embodiment can determine whether the information to be displayed can be displayed on the screen to the greatest extent.

In the above embodiments, the screen display method is described in detail, and the present application also provides corresponding embodiments of the screen display device. It should be noted that the present application describes the embodiments of the screen display device from two perspectives. One is based on the perspective of functional modules, and the other is based on the perspective of hardware.

Figure 4:
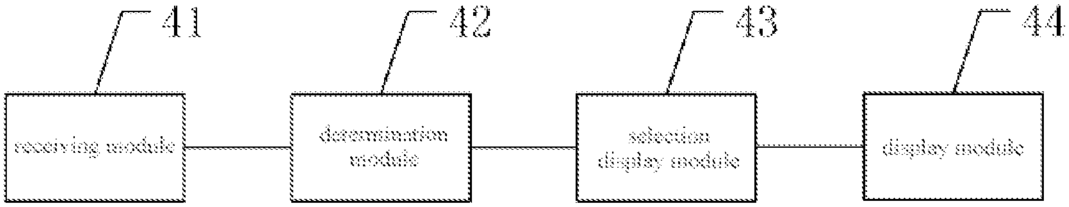
FIG. 4 is a structural diagram of a screen display device according to an embodiment of the present application.

FIG. 4 is a structural diagram of a screen display device according to an embodiment of the present application; as shown in FIG. 4, the screen display device comprises:

- a receiving module 41 configured to receive information to be displayed;
- a determination module 42 configured to determine whether the buffer memory required for displaying the information to be displayed is greater than a preset buffer memory, and if so, then triggering a selection display module 43; if not, then triggering a display module 44;
- the selection display module 43 configured to control the screen to select a display strategy for reducing buffer memory usage to display the information to be displayed;
- the default display module 44 configured to control the screen to display the information to be displayed.

The receiving module 41 receives the information to be displayed, which refers to the information to be displayed on the screen of the electronic device, comprising but not limited to, information to be displayed on the next page of the screen when the UI of the electronic device is switched, the information to be displayed that needs to be displayed on the screen when the electronic device changes from a shutdown state to a startup state; the information to be displayed that is notified by the terminal device is received when the electronic device is connected to the terminal device. The determination module 42 determines whether the buffer memory required for displaying the information to be displayed is greater than the preset buffer memory. Specifically, after receiving the information to be displayed, it calculates the buffer memory required for displaying the information to be displayed in the default format or the preset format, and determines whether the required buffer memory is greater than the preset buffer memory, and if so, triggering the selection display module 43, and if not, triggering the default display module 44; the selection display module 43 controls the screen to select a display strategy for reducing the buffer memory usage to display the information to be displayed, wherein the display strategy for reducing the buffer memory usage refers to reducing the size of the required buffer by changing the display method of the information to be displayed, so that the information to be displayed can be stored in the buffer at one time; the display module 44 controls the screen to display the information to be displayed, specifically, the information to be displayed is stored in the buffer in the default format or the preset format, and the information to be displayed stored in the buffer is displayed on the screen in the default format or the preset format through the buffer interface.

The screen display device provided in this embodiment, after receiving the information to be displayed, calculates the buffer memory size required when the information to be displayed is displayed in the default format or the preset format, and determines whether the buffer memory required for displaying the information to be displayed in the default format or the preset format is greater than the preset buffer memory, and if not, controls the screen to display the information to be displayed in the default format or the preset format, and if yes, which means that the buffer required for displaying the information to be displayed is too large at this time, then controls the screen to select the display strategy for reducing the buffer memory usage to display the information to be displayed, so that the information to be displayed can be stored in the buffer. By reducing the size of the buffer occupied by the information to be displayed, the information to be displayed can be stored in the buffer for easy display on the screen, thereby avoiding the problematic display results caused by still displaying the information to be displayed when the buffer is insufficient. Through the device according to this embodiment, in the case that the total memory of the system is limited, the system does not have to allocate a very large buffer to store the information to be displayed, thereby saving the memory occupied by the buffer, so that more memory is available for system operation, and also more memory is available for developing new functions. It is also possible to use a chip with a smaller total memory to reduce costs by the screen display device according to this embodiment.

Since the embodiments of the device correspond to the embodiments of the method, please refer to the description of the embodiments of the method for the embodiments of the device, and will not be repeated here.

Figure 5:
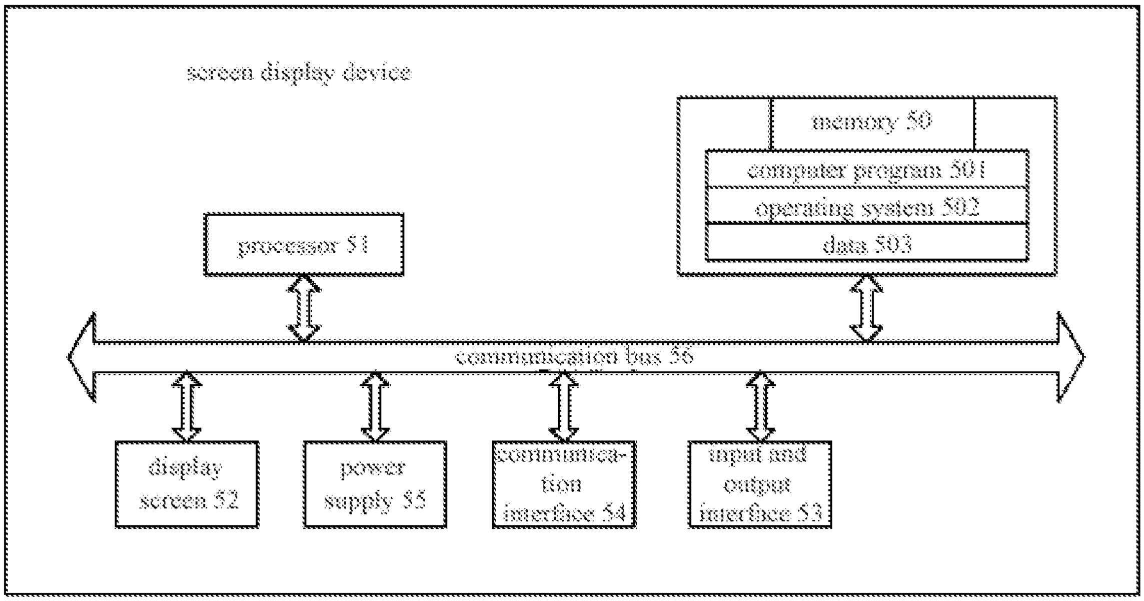
FIG. 5 is a structural diagram of a screen display device according to another embodiment of the present application.

FIG. 5 is a structural diagram of a screen display device according to another embodiment of the present application. As shown in FIG. 5, the screen display device comprises:

- a memory 50 configured to store a computer program;
- a processor 51 configured to implement steps of the screen display method in the above embodiment when executing the computer program.

The screen display device provided in this embodiment may comprise but is not limited to a smart phone, a tablet computer, a laptop computer, or a desktop computer, etc.

The processor 51 may comprise one or more processing cores, such as a 4-core processor, an 8-core processor, etc. The processor 51 may be implemented in at least one form of hardware among digital signal processing (Digital Signal Processing, DSP), field-programmable gate array (Field-Programmable Gate Array, FPGA), and programmable logic array (Programmable Logic Array, PLA). The processor 51 may also comprise a main processor and a co-processor. The main processor is a processor configured to process data in the wake-up state, also called a central processing unit (Central Processing Unit, CPU); the co-processor is a low-power processor configured to process data in standby state.

In some embodiments, the processor 51 may be integrated with a graphics processor (Graphics Processing Unit, GPU), and the GPU is responsible for rendering and drawing content that need to be displayed on the display screen. In some embodiments, the processor 51 may also comprise an artificial intelligence (Artificial Intelligence, AI) processor, which is configured to process computing operations related to machine learning.

The memory 50 may comprise one or more computer-readable storage media, which may be non-transitory. The memory 50 may also comprise high-speed Random Access Memory, and a non-volatile memory, such as one or more disk storage devices, flash memory storage devices. In this embodiment, the memory 50 is at least configured to store the following computer program 501. Herein, after the computer program is loaded and executed by the processor 51, the relevant steps of the screen display method disclosed in any of the foregoing embodiments can be implemented. In addition, the resources stored in the memory 50 may also comprise an operating system 502, data 503, etc., and the storage method may be short-term storage or permanent storage. Herein, the operating system 502 may comprise Windows, Unix, Linux, etc. Data 503 may comprise but is not limited to data involved in implementing the screen display method, etc.

In some embodiments, the screen display device may also comprise a display screen 52, an input-output interface 53, a communication interface 54, a power supply 55 and a communication bus 56.

Those skilled in the art can understand that the structure shown in FIG. 5 does not constitute a limitation on the screen display device, and may comprise more or fewer components than that shown in the figures.

The screen display device according to the embodiment of the present application comprises a memory and a processor. When the processor executes the program stored in the memory, a screen display method can be implemented. The screen display method reduces the size of the buffer occupied by the information to be displayed, so that the information to be displayed can be stored in the buffer for easy display on the screen, thus avoiding the problematic display results caused by still displaying the information to be displayed when the buffer is insufficient. In the case that the total memory of the system is limited, the system does not have to allocate a very large buffer to store the information to be displayed, thereby saving the memory occupied by the buffer, so that more memory is available for system operation, and also more memory is available for developing new functions. It is also possible to use a chip with a smaller total memory to reduce costs.

Finally, the present application also provides a corresponding embodiment of a computer-readable storage medium. A computer program is stored on the computer-readable storage medium. When the computer program is executed by the processor, the steps as described in the above embodiments of the screen display method are implemented.

It can be understood that if the methods in the above embodiments are implemented in the form of software functional units and sold or used as independent products, they can be stored in a computer-readable storage medium. Based on this understanding, the part of the technical solution of the present application which is essentially or contributes to the existing technology, or all or part of the technical solution can be embodied in the form of a software product, and the computer software product is stored in a storage medium, performs all or part of the steps of the methods described in various embodiments of the present application. The above-described storage medium comprises: U disk, mobile hard disk, read-only memory (Read-Only Memory, ROM), random access memory (Random Access Memory, RAM), magnetic disk or optical disk and other medium that can store program code.

The computer-readable storage medium provided in this embodiment has a computer program stored therein. When the program is executed by the processor, the following steps can be implemented: after receiving the information to be displayed, it calculates the buffer memory size required when the information to be displayed is displayed in the default format or the preset format, and determines whether the buffer memory required for displaying the information to be displayed in the default format or the preset format is greater than the preset buffer memory, and if not, controls the screen to display the information to be displayed in the default format or the preset format, and if yes, which means that the buffer required for displaying the information to be displayed is too large at this time, then controls the screen to select the display strategy for reducing the buffer memory usage to display the information to be displayed so that the information to be displayed can be stored in the buffer. By reducing the size of the buffer occupied by the information to be displayed, the information to be displayed can be stored in the buffer for easy display on the screen, thereby avoiding the problematic display results caused by still displaying the information to be displayed when the buffer is insufficient. In the case that the total memory of the system is limited, the system does not have to allocate a very large buffer to store the information to be displayed, thereby saving the memory occupied by the buffer, so that more memory is available for system operation, and also more memory is available for developing new functions. It is also possible to use a chip with a smaller total memory to reduce costs.

The screen display method, screen display device and computer-readable storage medium according to the present application have been introduced in above. Each embodiment in the specification is described in a progressive manner. Each embodiment focuses on its differences from other embodiments. The same and similar parts between the various embodiments can be referred to each other. As for the device disclosed in the embodiment, since it corresponds to the method disclosed in the embodiment, the description is relatively simple. For relevant details, please refer to the description in the method section. It should be noted that for those of ordinary skill in the art, several improvements and modifications can be made to the present application without departing from the principles of the present application, and these improvements and modifications also fall within the protection scope of the claims of the present application.

It should also be noted that in this specification, relational terms such as first and second are only used to distinguish one entity or operation from another entity or operation, and do not necessarily require or imply that these entities or operations have such actual relationship or sequence between them. Furthermore, the terms "comprise," "include," or any other variations thereof are intended to cover a non-exclusive inclusion such that a process, method, article, or device that comprises a list of elements comprises not only those elements, but also those not expressly listed other elements, or elements inherent to the process, method, article or equipment. Without further limitation, an element defined by the statement "comprises a . . . " does not exclude the presence of additional identical elements in a process, method, article, or device that comprises the stated element.

What is claimed is:

1. A screen display method, comprising:

receiving information to be displayed;

determining whether a buffer memory required for displaying the information to be displayed is greater than a preset buffer memory;

in response to the buffer memory being greater than the present buffer memory, controlling a screen to select a display strategy for reducing buffer memory usage to display the information to be displayed; and in response to the buffer memory being not greater than the preset buffer memory, controlling the screen to display the information to be displayed in a default format, wherein the preset buffer memory is a buffer memory required for completely displaying one page by the screen in the default format.

2. The screen display method according to claim 1, wherein the information to be displayed is the information to be displayed notified by a terminal device, and the information to be displayed only comprises picture information, and the determining whether the buffer memory required for displaying the information to be displayed is greater than the preset buffer memory comprises:

determining whether a first buffer memory required for displaying the information to be displayed in the default format is greater than the preset buffer memory, in response to the first buffer memory being greater than the preset buffer memory, determining that the buffer memory required for displaying the information to be displayed is greater than the preset buffer memory, and the controlling the screen to select a display strategy for reducing buffer memory usage to display the information to be displayed comprises: controlling the screen to display the information to be displayed as a text character; and in response to the first buffer memory being not greater than the preset buffer memory, determining that the buffer memory required for displaying the information to be displayed is not greater than the preset buffer memory; and the controlling the screen to display the information to be displayed comprises: controlling the screen to display the information to be displayed in the default format.

3. The screen display method according to claim 1, wherein the information to be displayed is the information to be displayed notified by a terminal device, and the information to be displayed only comprises text information, and the determining whether the buffer memory required for displaying the information to be displayed is greater than the preset buffer memory comprises:

determining whether a first buffer memory required for displaying the information to be displayed in the default format is greater than the preset buffer memory, in response to the first buffer memory being greater than the preset buffer memory, determining that the buffer memory required for displaying the information to be displayed is greater than the preset buffer memory, and the controlling the screen to select a display strategy for reducing buffer memory usage to display the information to be displayed comprises: controlling the screen to display the information to be displayed in a low-resolution format, wherein the buffer memory required for displaying the information to be displayed in the default format is higher than the buffer memory required for displaying the information to be displayed in the low-resolution format; and in response to the first buffer memory being not greater than the preset buffer memory, determining that the buffer memory required for displaying the information to be displayed is not greater than the preset buffer memory, and the controlling the screen to display the information to be displayed comprises: controlling the screen to display the information to be displayed in the default format.

4. The screen display method according to claim 3, wherein the displaying the text information in the low-resolution format comprises:

determining whether a second buffer memory required for displaying the text information in the low-resolution format is greater than the preset buffer memory;

in response to the second buffer memory being not greater than the preset buffer memory, controlling the screen to display the text information in the low-resolution format; and in response to the second buffer memory being greater than the preset buffer memory, controlling the screen to paginate and display the text information in the low-resolution format.

5. The screen display method according to claim 1, wherein the information to be displayed is the information to be displayed notified by a terminal device, and the information to be displayed comprises picture information and text information, and the determining whether the buffer memory required for displaying the information to be displayed is greater than the preset buffer memory comprises: determining whether a first buffer memory required for displaying the picture information in the information to be displayed in the default format is greater than the preset buffer memory;

in response to the first buffer memory being greater than the preset buffer memory, determining that the buffer memory required for displaying the information to be displayed is greater than the preset buffer memory, and the controlling the screen to select a display strategy for reducing buffer memory usage to display the information to be displayed comprises: controlling the screen to display the picture information in the information to be displayed as a text character; and in response to the first buffer memory being not greater than the preset buffer memory, determining that the buffer memory required for displaying the information to be displayed is not greater than the preset buffer memory, and the controlling the screen to display the information to be displayed comprises: controlling the screen to display the picture information in the information to be displayed in the default format.

6. The screen display method according to claim 5, wherein the determining whether the buffer memory required for displaying the information to be displayed is greater than the preset buffer memory further comprises:

determining whether a second buffer memory required for displaying the text information in the information to be displayed in the default format is greater than a remaining buffer memory, wherein the remaining buffer memory is a difference between the preset buffer memory and a buffer memory occupied by displaying the picture information in the information to be displayed;

in response to the second buffer memory being greater than the remaining buffer memory, determining that the buffer memory required for displaying the information to be displayed is greater than the preset buffer memory, and the controlling the screen to select a display strategy for reducing buffer memory usage to display the information to be displayed comprises:

controlling the screen to display the text information in the information to be displayed in a low-resolution format;

in response to the second buffer memory being not greater than the remaining buffer memory and the first buffer memory being greater than the preset buffer memory, determining that the buffer memory required for displaying the information to be displayed is greater than the preset buffer memory, and the controlling the screen to select a display strategy for reducing buffer memory usage to display the information to be displayed comprises: controlling the screen to display the picture information in the information to be displayed as a text character, and displaying the text information in the information to be displayed in the default format; and in response to the second buffer memory being not greater than the remaining buffer memory and the first buffer memory being not greater than the preset buffer memory, determining that the buffer memory required for displaying the information to be displayed is not greater than the preset buffer memory, and the controlling the screen to display the information to be displayed comprises: controlling the screen to display the picture information in the information to be displayed in the default format, and displaying the text information in the information to be displayed in the default format.

7. The screen display method according to claim 1, wherein the information to be displayed is the information to be displayed by a screen page UI, and the information to be displayed only comprises text information, and the determining whether the buffer memory required for displaying the information to be displayed is greater than the preset buffer memory comprises:

determining whether a first buffer memory required for displaying the text information in the default format is greater than the preset buffer memory;

in response to the first buffer memory being greater than the preset buffer memory, determining that the buffer memory required for displaying the information to be displayed is greater than the preset buffer memory, and the controlling the screen to select a display strategy for reducing buffer memory usage to display the information to be displayed comprises: controlling the screen to display the information to be displayed in a low-resolution format; and in response to the first buffer memory being not greater than the preset buffer memory, determining that the buffer memory required for displaying the information to be displayed is not greater than the preset buffer memory, and the controlling the screen to display the information to be displayed comprises: controlling the screen to display the information to be displayed in the default format.

8. The screen display method according to claim 1, wherein the information to be displayed is the information to be displayed by a screen page UI, and the information to be displayed comprises picture information and text information, and the determining whether the buffer memory required for displaying the information to be displayed is greater than the preset buffer memory comprises:

determining whether a first buffer memory required for displaying the text information in the default format is greater than an available buffer memory, wherein the available buffer memory is a difference between the preset buffer memory and a buffer memory occupied by displaying the picture information in a preset format;

in response to the first buffer memory being greater than the available buffer memory, determining that the buffer memory required for displaying the information to be displayed is greater than the preset buffer memory, why and the controlling the screen to select a display strategy for reducing buffer memory usage to display the information to be displayed comprises: controlling the screen to display the picture information in the information to be displayed in the preset format, and displaying the text information in the information to be displayed in a low-resolution format; and in response to the first buffer memory not being greater than the available buffer memory, determining that the buffer memory required for displaying the information to be displayed is not greater than the preset buffer memory, and the controlling the screen to display the information to be displayed comprises: controlling the screen to display the picture information in the information to be displayed in the preset format, and displaying the text information in the information to be displayed in the default format.

9. A screen display device, comprising:

a memory configured to store a computer program; and a processor configured to implement steps of the screen display method according to claim 1 when executing the computer program.

10. A screen display device, comprising:

a receiving module configured to receive information to be displayed;

a determination module configured to determine whether a buffer memory required for displaying the information to be displayed is greater than a preset buffer memory, and if so, triggering a selection display module, and if not, triggering a display module;

the selection display module configured to control a screen to select a display strategy for reducing buffer memory usage to display the information to be displayed; and the display module configured to control the screen to display the information to be displayed in a default format, wherein the preset buffer memory is a buffer memory required for completely displaying one page by the screen in the default format.

* * * * *